April 7, 1936.   E. B. ANDERSON   2,036,977
UNIVERSAL JOINT
Filed Aug. 29, 1934
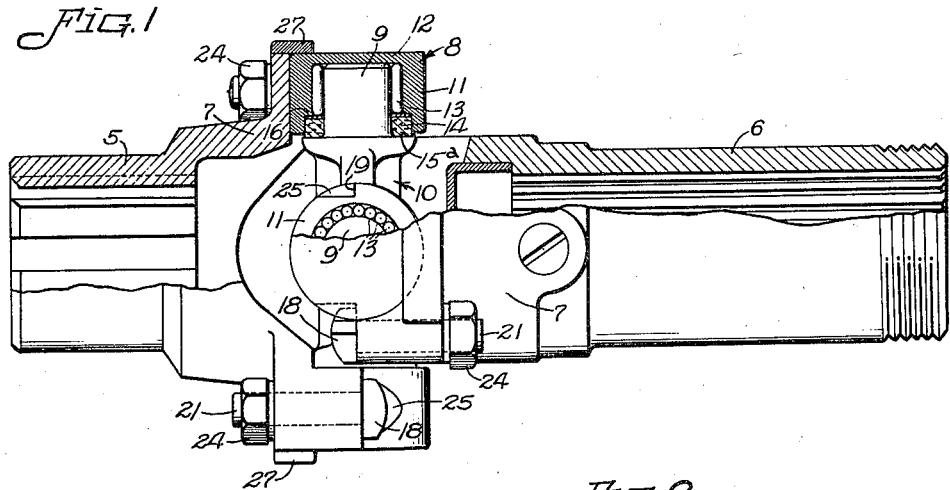
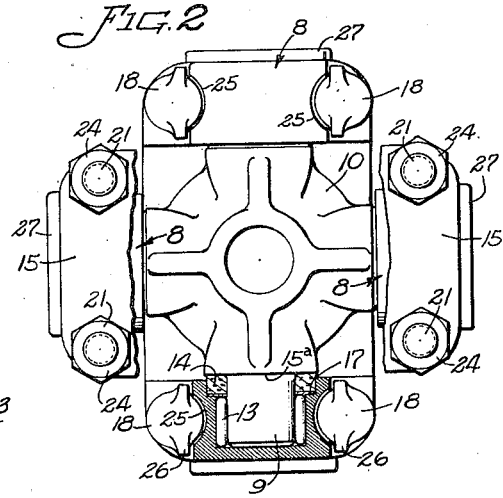
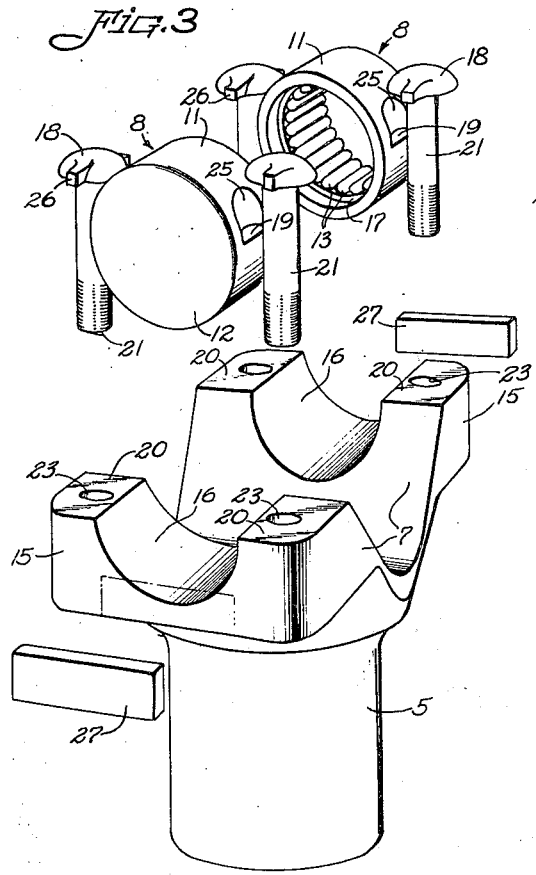
INVENTOR
Edmund B. Anderson
By Chindall, Parker Carlson
ATTORNEYS Patented Apr. 7, 1936

2,036,977

UNITED STATES PATENT OFFICE 2,036,977

UNIVERSAL JOINT

Edmund B. Anderson, Rockford, Ill., assignor of one-third to Milton B. Anderson, and one-third to Carl E. Swenson, both of Rockford, Ill.

Application August 29, 1934, Serial No. 741,926

7 Claims. (Cl. 64—17)

This invention relates generally to universal joints and more particularly to those of the type used in automotive vehicles.

The primary object of the invention is to provide a universal joint which, by virtue of the novel character of its construction, is capable of withstanding the wear and tear of long service use and yet may be manufactured at a substantially lower cost than the joints heretofore used.

The invention resides more particularly in the novel means employed for fastening the cylindrical bearings for the trunnions to the yokes of the joint.

Other objects and advantages of the invention will become apparent from the following detailed description, taken in connection with the accompanying drawing, in which Figure 1 is an elevational view partially in section of a joint embodying the novel features of the present invention.

Figure 2 is an end view with part of the yokes broken away.

Figure 3 is a perspective view showing in separated relation one of the yokes and the parts associated therewith.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The universal joint shown by way of illustration includes two forged yokes 5 and 6 of similar construction adapted for connection with driving and driven shafts (not shown). Each yoke has two arms 7 each supporting a bearing support generally designated by the numeral 8 and having journaled therein one radial trunnion 9 of a forged spider 10, the arms of which are spaced 90° apart.

To permit of manufacture at low cost by high speed production methods, the bearing supports 8 are of cylindrical external contour comprising sleeves 11 of substantial thickness adapted to be received on the trunnions 9 and preferably closed at their outer ends by walls 12 which bear against the ends of the trunnions. The walls 12 thus sustain any thrust exerted by the trunnions and also serve to protect the bearing surface. When, as in the present instance, bearings of the antifriction type are used, each sleeve 11 serves as a retainer or cage for a series of small diameter rollers 13 arranged around the internal surface of the sleeve and adapted to roll in direct contact with the machined periphery of the trunnion 9. To further protect the bearing surfaces and assist in the retention of lubricant around the rollers 13, a washer 14 of cork or other suitable material is interposed between a shoulder 15ª at the inner end of the trunnion and a metal washer 16. The latter abuts against a shoulder 17 on the sleeve 9 cooperating with the end wall 12 to hold the rollers 13 in place. It will be observed that the cup shaped bearing cage constructed in this manner, may for example, be formed in an automatic screw machine and therefore at a low cost.

The ends of the yoke arms 7 are formed with outwardly projecting flanges 15 and are recessed to define seats 16 conforming in length and external contour to the bearing sleeves 11 and partially enclosing the latter. To provide for maximum strength in resisting the stresses exerted laterally of the bearings, the seats 16 should enclose approximately half or preferably slightly more than half of the sleeve circumference.

The invention contemplates attachment of the bearing sleeves to the yoke arms by a novel means which is not only inexpensive in construction and convenient to assemble but effectually holds the sleeves in place without subjecting them to substantial distorting pressure. This means comprises two clamping devices disposed on opposite sides of the sleeve 11 and having heads 18 which overhang the edges of the seats 16 and bear against shoulders 19 formed on diametrically opposite sides of the sleeve immediately adjacent the end surfaces 20 of the yoke arms. In the present instance, the clamping devices are in the form of bolts 21, the threaded ends of which project through parallel holes 23, drilled in the flanges 15 adjacent the sleeve recess. The clamping pressure is applied by tightening nuts 24 onto the bolts.

The shoulders 19 are formed on the sleeve 11 in any suitable way as by cutting recesses 25 with an end milling cutter. Preferably the shoulders are disposed only slightly above the surfaces 20 so that the clamping pressure will be exerted properly on the shoulders without danger of stressing the bolt heads unnecessarily. The latter have flat under sides of such sizes as to afford proper area of contact with the shoulders 19. Wings 26 may be formed on the heads to hold the bolts against turning during tightening or loosening of the nuts.

By employing two clamping devices engaging the bearing sleeve 11 on diametrically opposite sides and closely adjacent the plane of the trunnion axes, it will be observed that separate clamping forces are applied substantially tangentially of the sleeve. Thus, the lines of the forces do not intersect the sleeves and therefore there is no appreciable tendency for the sleeve to become distorted under the clamping pressure to which it is subjected. Moreover, no objectionable stresses are exerted on any part of the joint either in the assembly or in the service use thereof.

Accurately located means is provided for holding the bearing sleeves 11 against end play on the trunnions. Herein this means comprises a metal block 27 secured as by spot welding to the outer side surface of each yoke arm and overlying and bearing against the wall 12 of the bearing support. Inasmuch as the sides of the yokes and the ends of the trunnions may be located accurately and conveniently by grinding operations and the wall 12 is an accurately formed part, a high degree of accuracy may be obtained in the axial location of the bearing sleeve by the use of a retaining member mounted like the block 27.

From the foregoing it will be observed that the construction of the yoke arms 7 is such as to reduce machining costs to a minimum. This is for the reason that drilling of the holes 23 and machining of the surfaces 16 and 20 are the main operations required. Moreover, these surfaces are so arranged that they may be completely finished in a single high speed operation such as surface broaching. In addition to its simplicity of construction, the fastening means is advantageous in that it permits of a direct engagement with the bearing member without applying distorting forces thereto. Thus by virtue of the construction employed, material and assembly costs and the number and complexity of the machining operations required are reduced to a minimum, and this, without sacrificing ruggedness and durability of the joint.

I claim as my invention:

1. In a universal joint, the combination of a spider having radially projecting trunnions, a cylindrical bearing sleeve received on one of said trunnions, a yoke having an arm recessed at its end to define a seat partially enclosing said sleeve, and clamping devices anchored in said arm and engaging the sleeve on diametrically opposite sides thereof to exert forces thereon acting in substantially tangential directions to clamp the sleeve against said seat.

2. In a universal joint, the combination of a spider having radially projecting trunnions, a cylindrical bearing sleeve received on one of said trunnions, a yoke having an arm recessed at its end to define a seat partially enclosing said sleeve, shoulders formed on opposite sides of said sleeve adjacent the end surface of said arm, and two screws anchored in said arm on opposite sides of said sleeve and having heads overlying said shoulders to clamp the sleeve in said seat.

3. In a universal joint, the combination of a spider having radially projecting trunnions, a bearing member received on one of said trunnions and having a cylindrical external contour, a yoke having an arm recessed at its end to define a seat conforming to the contour of said member and enclosing approximately half of the periphery thereof, recesses formed in said member to define radial shoulders on opposite sides of said member disposed substantially in the plane of the end surface of said arm, screws projecting into and anchored in said arm on opposite sides of said member and having heads engaging said surfaces and applying pressures thereto for clamping the member in said seat.

4. In a universal joint, the combination of a spider having radially projecting trunnions, a bearing member received on one of said trunnions and having a cylindrical external contour, a yoke having an arm recessed at its end to define a seat conforming to the contour of said member, said member having recesses milled in opposite sides of its periphery to form shoulders disposed substantially radially of the member, and means engaging said shoulders to clamp said member in said seat.

5. In a universal joint, the combination of a spider having radially projecting trunnions, a bearing member received on one of said trunnions and having a cylindrical external contour, a yoke having an arm recessed at its end to define a semi-cylindrical seat for said member, integral shoulders formed on opposite sides of said member, and means engaging said shoulders and applying pressure thereto for clamping the member in said seat, and separate means secured to the said arm at the outer end of said seat and engaging the end of said member to locate the member axially.

6. In a universal joint, the combination of a spider having radially projecting trunnions, a cylindrical bearing sleeve received on one of said trunnions, a yoke having an arm recessed at its end to define a seat partially enclosing said sleeve, clamping devices anchored in said arm on opposite sides of said sleeve and applying substantially tangential forces to said sleeve to clamp the latter in said seat, and independent means for holding the sleeve against outward axial movement.

7. In a universal joint, the combination of a spider having radially projecting trunnions, a bearing sleeve of cylindrical external contour received on one of said trunnions and having recesses formed in diametrically opposite sides thereof to provide substantially radially disposed shoulders, a yoke having an arm recessed at its ends to define a semi-cylindrical seat receiving said sleeve, and clamping devices anchored in said arm and engaging said shoulders to apply to said sleeve forces acting in substantially tangential directions to clamp the sleeve in said seat.

EDMUND B. ANDERSON.